Patented Oct. 9, 1945

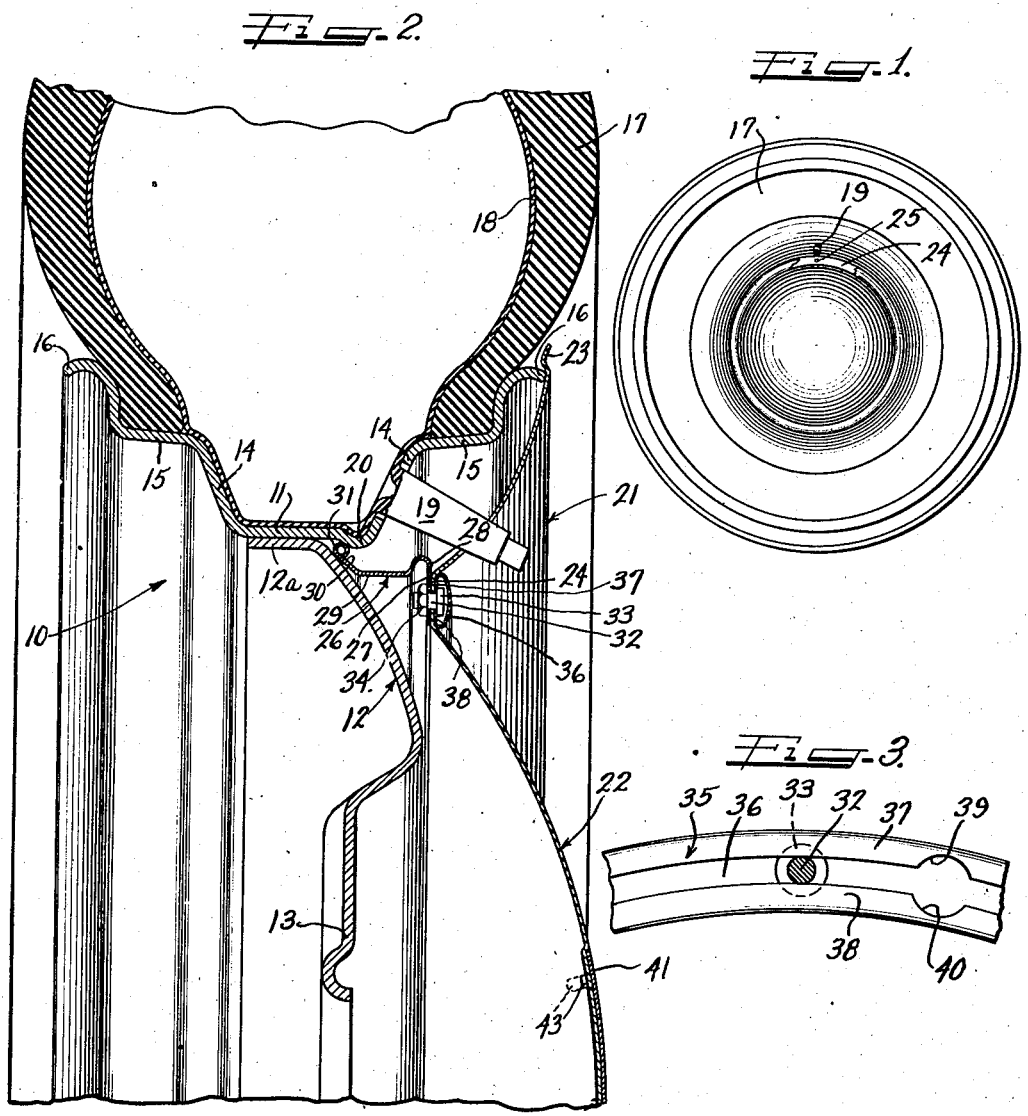

2,386,243

UNITED STATES PATENT OFFICE 2,386,243

WHEEL STRUCTURE

George Albert Lyon, Allenhurst, N. J.

Application December 31, 1943, Serial No. 516,327

3 Claims. (Cl. 301—37)

This invention is directed to an improved wheel structure and relates more particularly to an improved cover assembly therefor.

It is an important object of the present invention to provide an improved retaining arrangement for detachably securing a cover assembly over the outer side of a wheel structure.

It is another important object of the invention to provide an improved retaining arrangement for maintaining over the outer side of a wheel structure, a cover assembly including a radially outer annular part and a central circular hub cap simulating part, the latter being either integral or an independent portion of the cover assembly, the radially outer annular part being formed from sheet synthetic plastic material whereby it is self-sustaining as to form and locally resiliently flexible and whereby it immediately snaps back to its initial configuration upon release of distorting pressures therefrom, this radially outer annular cover portion extending from the outermost flange of the tire rim radially inwardly on the wheel and having a cross-sectional configuration substantially simulating a tire on the wheel to give the appearance of being a continuation thereof.

It is still a further object of the present invention to provide for a plastic, circular cover assembly, retaining means which maintains the same detachably on the outer side of a wheel structure and additionally is so associated with the cover as to efficiently strengthen and reinforce the portion of the plastic cover which it engages to retain the same upon the wheel.

It is still another object of the present invention to provide improved retaining means for maintaining a cover assembly over the outer side of a wheel structure, said retaining means including a part disposed on the outer side of the cover and arranged to maintain the cover against axial outward movement from the wheel and also to constitute a continuation of the cover assembly to appear as an annular bead thereon, thereby to augment the ornamental effect thereof.

Still another object of the invention is to provide an improved retaining assembly adapted for snap-on, pry-off, detachable engagement with the wheel structure, said retaining means being further provided with improved circular pry-off means available for removing the circular cover from the wheel structure at any point on the circumference thereof.

Still a further object of the present invention is to provide an improved cover assembly for disposition over the outer side of a wheel structure, said cover assembly including circular cover means formed from a resiliently compressible material which is locally, temporarily, flexible, yet self-sustaining as to form so that it immediately snaps back to initial configuration when distorting pressures are relieved therefrom, and improved retaining means preferably formed from a more rigid material such as sheet metal or the like, said retaining means and said cover being connected together in a novel manner, whereby the resiliently compressible material of the cover is disposed so as to act as a cushion against all adjacent metallic parts, thus to reduce greatly, the development of vibration and rattle in the resulting assembly.

In accordance with the general features of the present invention there is provided herein for disposition over the outer side of a wheel structure including a drop center type flanged tire rim and a central load bearing portion which is secured thereto, a circular cover assembly having a radially outer part and a central circular hub cap simulating part, said outer part simulating the side wall of the tire in the rim and being formed from sheet synthetic plastic material whereby it is self-sustaining as to form and yet locally flexible and whereby it will snap back into initial configuration when distorting pressures are relieved therefrom, there being provided retaining means having an axially inwardly extending snap-on flange which resiliently engages retaining means on the wheel structure and having an axially outer part including a radially outwardly extending bead and a radially inwardly extending flange, said bead serving as a pry-off anchor and said flange having apertures therein through which the shanks of bolts having enlarged heads disposed axially outwardly, may extend, said bolts being provided at the axially inner side of the flange with nuts, there also being provided in the cover assembly an intermediate circular groove portion aligned concentrically with the bolts in said flange, the heads of the bolts extending through the cover and being adapted to receive an annular bead member having an axially outwardly convex intermediate portion and bent back edge flanges spaced apart at their edges a distance substantially equal to the shanks of the bolts and having circumferentially spaced notches therein for providing bolt holes, whereby the bolt heads may be entered through the opposed notches and the bead rotated relative to the bolts and the cover, whereupon the nuts on the bolts may be tightened from the rear side of the flange on the retaining member to securely maintain the retaining member, the cover and the bead member together as a unitary structure.

Many other objects and advantages of the invention will become apparent from the following description and accompanying drawing, in which:

Figure 1 is a side elevational view of a wheel structure embodying my invention, a portion thereof being broken away for illustrative purposes;

Figure 2 is an enlarged fragmentary, cross-sectional view of a structure shown in Figure 1; and Figure 3 is a fragmentary enlarged, cross-sectional view taken on the line III—III of Figure 2.

While various forms of wheel structures may be utilized with the cover assembly of my invention, the wheel shown herein includes a tire rim 10 of the drop center flanged type having a central base flange 11 to which may be secured a central load bearing portion 12 by means of a peripheral, axially inwardly extending skirt or flange 12a thereof which may be secured to the bolt-on flange by welding or riveting or the like. The central load bearing portion is further provided with a radially inwardly extending bolt-on flange 13 arranged to retainingly receive wheel bolts whereby the wheel may be secured to an appropriate part of the vehicle such as the brake drum or the like.

The tire rim 10 is further provided with opposite side wall flanges 14, opposite intermediate flanges 15 and opposite edge portions 16 between which may be disposed a tire 17 having an inner tube 18 and a tire valve stem 19 that is aligned with and extends through an appropriate aperture in the respective side wall flange 14. If desired, the axially outer side wall flange 14 and the base flange 11 may be provided, at their junction, with a plurality of radially outwardly extending protuberances 20 which serve to provide companion indentations on the radially inner side of the rim whereby, when the inner tube 18 is inflated it will be forced into these indentations, thereby to prevent relative slippage between the tire and particularly the inner tube 18 thereof, and the wheel.

While many forms of retaining means on the wheel structure may be adapted for cooperation with the present invention, as will be seen presently, the protuberances 20 herein serve admirably as retaining means on the wheel for detachably receiving appropriate parts of the cover assembly so that the same may be maintained over the outer side of the wheel structure.

The cover assembly shown herein may be annular or in the form of a disk as in the present instance. As will be seen best from Figure 2, the cover, which is formed from sheet synthetic plastic material, thereby to have the characteristics set forth above, includes a radially outer annular portion 21 and a central crowned, hub cap simulating portion 22. The portion 21 is preferably provided with a cross-sectional shape whereby it conforms generally to the configuration of the side wall of the tire 17, thereby appearing as a continuation thereof and giving the appearance of being a part thereof and particularly appearing as a white side wall of a massive tire mounted on a wheel of minimum dimensions, when colored white.

Furthermore, the cover portion 21 is provided with a cross-sectional expanse whereby it extends radially outwardly beyond the edge portion 16 of the tire rim as by the radially outwardly extending flange 23 and then radially inwardly to a point preferably inwardly of the junction between the tire rim 10 and the central load bearing portion 12, thereby to have a relatively great expanse to augment the ornamental appearance thereof on the wheel. The junction between the cover parts 21 and 22, as shown in Figure 2, comprises a generally radially extending circular, integral flange part 24, this flange constituting the base of an axially outwardly facing intermediate circular groove disposed at the junction of the cover parts. The flange 24 is provided with a plurality of circumferentially spaced bolt holes 25 for purposes to be described presently.

An annular retaining member 26 formed from relatively rigid material such as sheet steel or the like is provided with a radially inwardly disposed flange 27 at the axially outer part thereof, this flange merging into a radially outwardly extending bead 28 which in turn merges into an axially inwardly extending flange 29. The flange 29 terminates in a generally axially inwardly, radially outwardly, obliquely disposed flange 30 which is bordered by a snap-on bead 31.

From Figure 2 it will be seen that the bead 31 prescribes a circle having a slightly larger diameter than that prescribed by the radially inner peaks of the protuberances 20 of the tire rim 10 and thus, when the retaining annulus 26 is forced axially inwardly on the wheel in concentric alignment therewith, the bead 31 is forced slightly out of round to permit the adjacent portions thereof to pass the peaks of the protuberances 20. Thereafter the bead 31 again assumes its circular configuration to rest tightly between the adjacent portion of the outer surface of the central load bearing portion 12 and the rear or axially inner sides of the respective protuberances.

To the end that the retaining member 26 and the cover portions 21 and 22 may be secured together as an integral unit to be attached to and removed from the wheel as such, the flange 27 of the retaining member is provided with a plurality of circumferentially spaced bolt apertures arranged to be aligned with those in the intermediate flange 24 of the cover. The bolts which extend through these aligned apertures include a shank portion 32 and axially outwardly extending head portions 33, the heads 33 being of greater size than the respective apertures whereby, when the bolts are passed through the aligned apertures in the flange 27 and flange 24 respectively, with the head axially outwardly, they will be retarded from axial inward movement beyond the position shown in Figure 2. The bolt assembly is completed by the provision of nuts 34 which are threaded to the axially inwardly extending portion of the respective bolts.

Thus it will be seen that before the assembly is mounted on the wheel structure, the apertures of the cover may be aligned with those of the retaining member 26, whereupon the bolts may be passed through the aligned apertures from the outside and the nuts 24 screwed loosely onto the shanks of the bolts. The bolt heads may then be forced outwardly so that there is a space provided between the inner surface thereof and the adjacent portion of the surface of the flange 24 of the cover member whereupon a rigidifying, ornamental annulus 35 may be secured thereto in a manner to be presently described.

The rigidifying annulus is preferably constructed from a relatively rigid material such as sheet stainless steel or the like, whereby the outside may be painted or may be provided with a high luster to give the desired ornamental appearance. The annulus 35 comprises an axially outer convex portion 36 bordered radially inwardly and outwardly by bent back flanges 37 and 38, the edges of the flanges 37 and 38, as best shown in Figure 3, being spaced apart from one another approximately a distance equal to the diameter of the shanks 32 of the bolts. To the end that the annulus 35 may be placed tightly against the outer surface of the flange 24 of the cover and thus the heads 33 of the bolts disposed axially outwardly of the flanges 37 and 38 thereof, these flanges are provided, at points aligned with the bolt apertures in the other parts of the cover assembly, with opposed notches 39 and 40 which afford apertures through which the bolt heads 33 may extend as shown in Figure 3. Thereafter the ornamental, rigidifying annular bead 35 may be rotated slightly whereupon the nuts 34 may be tightened to retain the entire cover assembly as a unit in the relationship shown in Figure 2.

Thereafter the operator need merely align the unitary cover assembly shown concentrically with the wheel structure and urge the same axially inwardly to obtain the detachable relationship between the bead 31 and protuberances 20 previously described.

With the above assembly it will be seen that since the cover is constructed from relatively resiliently compressible material such as sheet plastic or the like, the association of the metallic parts as a result of the tightening of the nuts 34 will be cushioned against the development of rattle and vibration due to fatigue or settling of the cushion and structure of the metal.

If desired, the central portion of the crowned part 22 of the cover may be depressed circularly as shown at 41, whereupon a medallion 42 having fingers 43 may be extended through apertures in the depressed portion 41 and bent to provide an attached relationship between the medallion and the cover. This medallion further augments the ornamental appearance of the cover and efficiently serves as an additional rigidifying or protecting means for the most vulnerable part of the cover, that is the portion which extends axially outwardly the greatest distance.

With the foregoing structure it will be seen that there is provided herein an improved retaining assembly which may be utilized on a single piece cover as shown herein, or may be utilized to anchor separate, radially outer and central cover members together on a retaining member so that a unitary structure is formed which may be handled as a unit and, as such may be secured to or detached from the wheel structure.

Another attribute of the foregoing construction is the provision of a cover assembly in which there is provided a minor part of metal and is made up largely from lighter, synthetic plastic material, whereby the unsprung weight of the wheel is greatly reduced. Another advantage of the foregoing construction and particularly in the provision of a plastic cover is that the cover itself is of the same color or hue throughout and thus there is no surface ornamentation which is removed by scratches or the like, thus resulting in a marring of the cover and in the development of rust spots.

Furthermore, it will be noted that with the construction described above, the cover may be easily removed by flexing the flange 23 outwardly to permit insertion of a pryoff tool behind the cover portion 21, whereupon the point of the tool may be placed against the inner side of the radially outwardly extending bead 28. The operator may then raise the outer part of the pry-off tool with the edge portion 16 as the fulcrum, whereupon the entire cover assembly will be drawn axially outwardly of the wheel structure so that the bead 31 is released from the adjacent protuberances 20. Thus the cover which is relatively frangible may be removed without subjecting portions thereof to extreme stress and strain and furthermore, during the assembled relationship of the cover with the wheel it will be seen that the intermediate part thereof, namely the flange 24 is solidly backed up by the flange 27 of the retaining members since they are maintained in surface abutment.

What I claim is:

1. In a wheel structure including a wheel having flanged tire rim and body parts, a wheel cover comprising a one-piece disc of resiliently yieldable form sustaining plastic and including a curved radially outer portion for substantially concealing outer flanges of the rim part and a central radially inner portion connected to the outer portion over said body part by a grooved intermediate annular section, an annular bead in said grooved section, cover retaining means on the rear side of said section for detachably engaging at least one of said wheel parts and means for securing said bead and retaining means to said intermediate section.

2. The structure of claim 1 further characterized by said retaining means including a peak portion accessible from the rear of said outer portion by the flexing of said outer portion axially away from said wheel and whereby a cover pry-off tool may be applied to said peaked portion.

3. The structure of claim 1 further characterized by the securing means tightly clamping said bead against said yieldable plastic disc to rigidify said outer portion at the junction of said outer and inner cover portions.

GEORGE ALBERT LYON.